A. F. KAILEY.
HOOF KNIFE.
APPLICATION FILED NOV. 10, 1909.
948,861.
Patented Feb. 8, 1910.
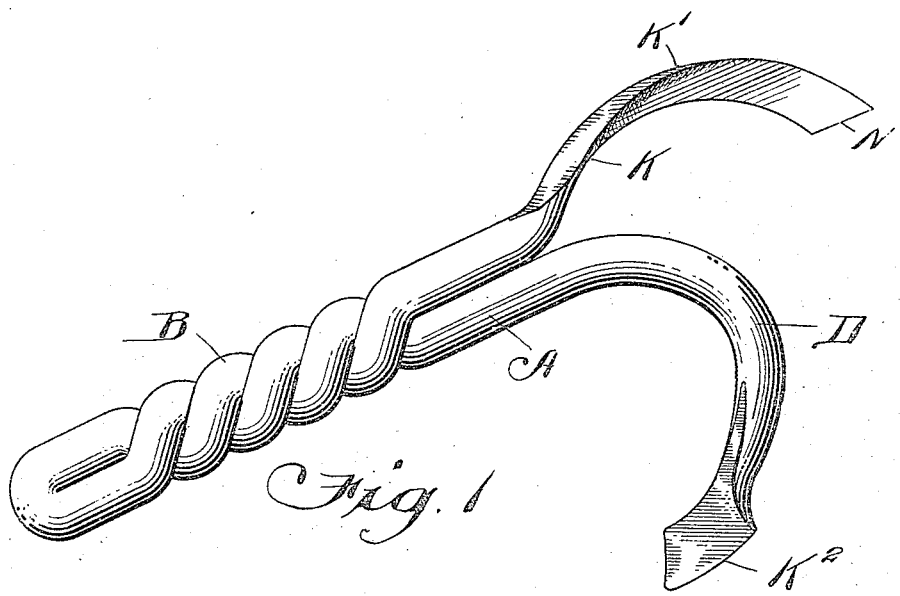
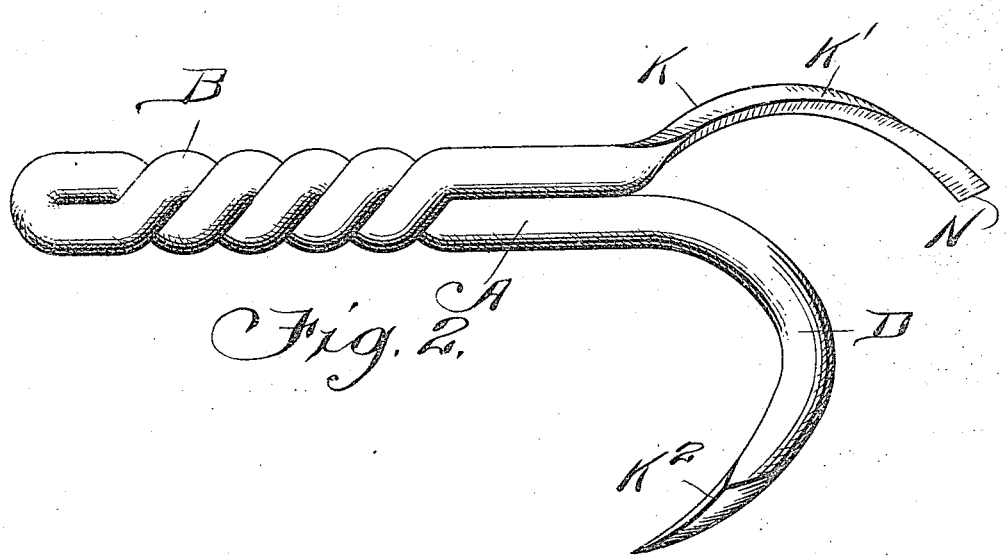

UNITED STATES PATENT OFFICE.

ALBERT F. KAILEY, OF ARAPAHOE, NEBRASKA.

HOOF-KNIFE.

948,861.  Specification of Letters Patent.  Patented Feb. 8, 1910.

Application filed November 10, 1909. Serial No. 527,265.

*To all whom it may concern:*

Be it known that I, ALBERT F. KAILEY, a citizen of the United States, residing at Arapahoe, in the county of Furnas and State of Nebraska, have invented certain new and useful Improvements in Hoof-Knives; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in hoof knives for use in treating hoofs of animals preparatory to their being shod and comprises various details of construction which will be hereinafter fully described and then specifically defined in the appended claims.

I illustrate my invention in the accompanying drawings, in which:—

Figure 1 is a perspective view of the tool made in accordance with my invention, and Fig. 2 is a side elevation showing the shape of the cutting ends of the tool.

Reference now being had to the details of the drawings by letter, A designates a rod which is preferably bent upon itself and twisted together, forming a shank portion B. One end D of the rod is bent hook shaped as shown and is provided with a V-shaped or pointed and flattened cutting edge $K^2$. The other end of the rod is bent to form a concaved cutting knife K tapered to a sharp edge $K'$ and has a square or flat end N.

From the foregoing, it will be noted that, by the provision of a hoof knife as shown and described, a simple and efficient means is afforded whereby the creases may be cut by the V-shaped cutting edge and, by the provision of the concaved cutting knife, the hoof may be pared and trimmed putting the hoof in proper shape to be shod and affording in a single tool means for dressing the hoof.

What I claim to be new is:—

1. A hoof knife made up of a rod which is bent upon itself and twisted to form the shank portion of a handle, one end of the rod being bent to form a hook with a double beveled cutting edge, the other end formed into a blade with a longitudinal cutting edge.

2. A hoof knife comprising a rod bent upon itself and twisted to form a shank portion, one end of the rod being bent to form a hook and terminating in a V-shaped cutting edge, the other end bent to form a concaved cutting knife tapered to a longitudinal cutting edge and terminating in a flat end.

In testimony whereof I hereunto affix my signature in the presence of two witnesses.

ALBERT F. KAILEY.

Witnesses:
 GEORGE V. WATKINS,
 WILLIAM IRELAN.